(12) United States Patent
Bradley et al.

(10) Patent No.: US 6,366,580 B1
(45) Date of Patent: Apr. 2, 2002

(54) TRANSFERRING DATA COMMUNICATIONS FROM ONE ATM SVC TO ANOTHER ATM SVC

(75) Inventors: James Frederick Bradley, Middletown; Thomas P. Chu, Englishtown; Eberhard F. Wunderlich, Aberdeen, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/185,048

(22) Filed: Nov. 3, 1998

(51) Int. Cl.[7] .............................................. H04L 12/28
(52) U.S. Cl. ................ 370/395.2; 370/395; 370/395.61
(58) Field of Search ........................ 370/216, 217–228, 370/237, 238, 248, 252, 395, 351, 389, 395.1, 395.2, 395.61, 468, 431, 437

(56) References Cited

U.S. PATENT DOCUMENTS

| | | | |
|---|---|---|---|
| 5,471,460 A | * 11/1995 | Tanabe ........................ 370/218 |
| 6,028,861 A | * 2/2000 | Soirinsuo et al. ........... 370/395 |
| 6,097,726 A | * 8/2000 | Puntambekar et al. ...... 370/397 |
| 6,226,260 B1 | * 5/2001 | McDysan .................... 370/216 |
| 6,256,295 B1 | * 7/2001 | Callon ......................... 370/254 |

* cited by examiner

Primary Examiner—David R. Vincent
(74) Attorney, Agent, or Firm—Banner & Witcoff

(57) ABSTRACT

A method of changing the characteristics of telephone call data on an ATM network that is initially transmitted via a first SVC between a first ATM switch and a second ATM switch is described. The method includes the steps of sending a set-up message for a second SVC from the first ATM switch to the second ATM switch and sending a switch-over request message from the first ATM switch to the second ATM switch via the second SVC. The method further includes the steps of sending a switch-over acknowledge message from the second ATM switch to the first ATM switch via the second SVC and sending a switch-over begin message from the first ATM switch to the second ATM switch via the second SVC. The method further includes the steps of sending a switch-over confirm message from the second ATM switch to the first ATM switch via the second SVC and transmitting the telephone call data via the second SVC. The steps executed by the present invention insure that the switch-over from the first SVC to the second SVC is accomplished without interrupting service.

23 Claims, 3 Drawing Sheets

TRANSFERRING DATA COMMUNICATIONS FROM ONE ATM SVC TO ANOTHER ATM SVC

FIELD OF THE INVENTION

The present invention is directed to data communications using asynchronous transfer mode. More particularly, the present invention is directed to transferring data communications from one asynchronous transfer mode switched virtual circuit to another asynchronous transfer mode switched virtual circuit without interruption of service.

BACKGROUND OF THE INVENTION

Asynchronous Transfer Mode ("ATM") is a switching technology based on switching and multiplexing techniques selected by the International Telecommunication Union ("ITU"). ATM utilizes a small fixed-size packet, referred to as an ATM cell. Each ATM cell is 53 octets (one octet equals one byte) long and is divided into a header of 5 octets and an information field of 48 octets that is sometimes referred to as a payload.

The ITU has further defined ATM adaptation layers ("AALs"). An AAL is the upper layer of the ATM layer and is responsible for converting user information from higher layers into a 48 octet payload field while the ATM cell layer adds the 5 octet header to make the 53 octet ATM cell. A family of AALs, AAL1 through. AAL5, has been defined to handle diverse user applications. The AAL is usually subdivided into two parts: the Common Part Convergence Sub-layer ("CPCS") and the Service-Specific Convergence Sub-layer ("SSCS"). The SSCS defines formatting for different applications onto ATM cells.

AAL2 can handle compressed voice through the use of variable size packets, sometimes referred to as "mini-packets." In AAL2, multiple channels are typically multiplexed onto a single ATM switched virtual circuit ("SVC"). In a network environment where there are multiple network devices communicating with each other, switching at the AAL2 layer is required. Specifically, an ATM switch must first de-multiplex incoming AAL2 packets over an ATM SVC and then switch the AAL2 packets to the appropriate outgoing ATM SVC. The AAL2 packets are then multiplexed for transmission again.

A regular ATM switch, with minor modifications to its line interface cards, can accomplish this mini-packet switching function. Implementation is straight-forward and relatively simple. However, this adds a layer of complexity to the ATM switch. Further, call signaling at the AAL2 layer is needed, and industry standards for this have not yet been adopted.

Therefore, in some situations, there may be advantages to having a single channel per ATM SVC instead of multiplexing multiple channels onto a single SVC. Having a single channel per ATM SVC is referred to as single channel adaptation ("SCA"). SCA avoids the necessity of having to de-multiplex and multiplex at the packet level. As a consequence, standard ATM switching can be used.

SCA can be used over any AAL, including AAL2 and AAL5. When using SCA, a major concern is how to handle facsimile or modem-based telephone calls (referred to as "fax calls").

For example, at the beginning of a fax call, the network has no way of knowing whether it is a fax call or a regular voice call. In general, the network allocates 64 Kbps for the call at call set-up time (i.e., no compression of the call). In the first few seconds, the input from the caller is transported un-compressed at 64 Kbps. In the ingress ATM switch, the signal is analyzed to determine whether it is a fax call or not by detecting the presence or absence of a 2100 Hz tone from the call receiving device as specified in the ITU T.30 standard.

If the gateway ATM switch decides that the call is a regular voice call, it should begin to compress the incoming signal. The gateway ATM switch should then inform the network to allocate a lower bandwidth to support this call. Conversely, the user may want to talk on the phone and subsequently transmit a fax. In this case, the bandwidth needs to be increased.

One known way to change the bandwidth of a call is through the use of the Modify command. The Modify command is an ITU standard command that allows a switch to change the traffic characteristics of an ATM connection. However, there are problems with relying on the Modify command. For one, the Modify command is not an ATM Forum standard command. Most ATM switches adhere to the ATM Forum standards. Therefore, most ATM switch vendors have not incorporated the Modify command into their switches. For a call that spans multiple networks, it is likely that the Modify command capability is not available across all ATM switches that service a call. If any switch servicing the call does not support the Modify command, the bandwidth cannot be changed using the Modify command and some bandwidth may be wasted.

Based on the foregoing, there is a need for a method and apparatus for increasing or decreasing the bandwidth of a connection over an ATM network without using the Modify command.

SUMMARY OF THE INVENTION

One embodiment of the present invention is a method of changing the characteristics of telephone call data on an ATM network that is initially transmitted via a first SVC between a first ATM switch and a second ATM switch. The method includes the steps of sending a set-up message for a second SVC from the first ATM switch to the second ATM switch and sending a switch-over request message from the first ATM switch to the second ATM switch via the second SVC. The method further includes the steps of sending a switch-over acknowledge message from the second ATM switch to the first ATM switch via the second SVC and sending a switch-over begin message from the first ATM switch to the second ATM switch via the second SVC. The method further includes the steps of sending a switch-over confirm message from the second ATM switch to the first ATM switch via the second SVC and transmitting the telephone call data via the second SVC. The steps executed by the present invention insure that the switch-over from the first SVC to the second SVC is accomplished without interrupting service.

DETAILED DESCRIPTION

In accordance with one embodiment of the present invention, instead of modifying the characteristics of the existing ATM SVC, the ingress (or egress) ATM switch will establish a second ATM SVC. Once the second SVC is established, the two end ATM switches will switch user traffic from the original SVC to the new SVC. The present invention ensures that the switch is accomplished without interrupting service.

Figure 1:
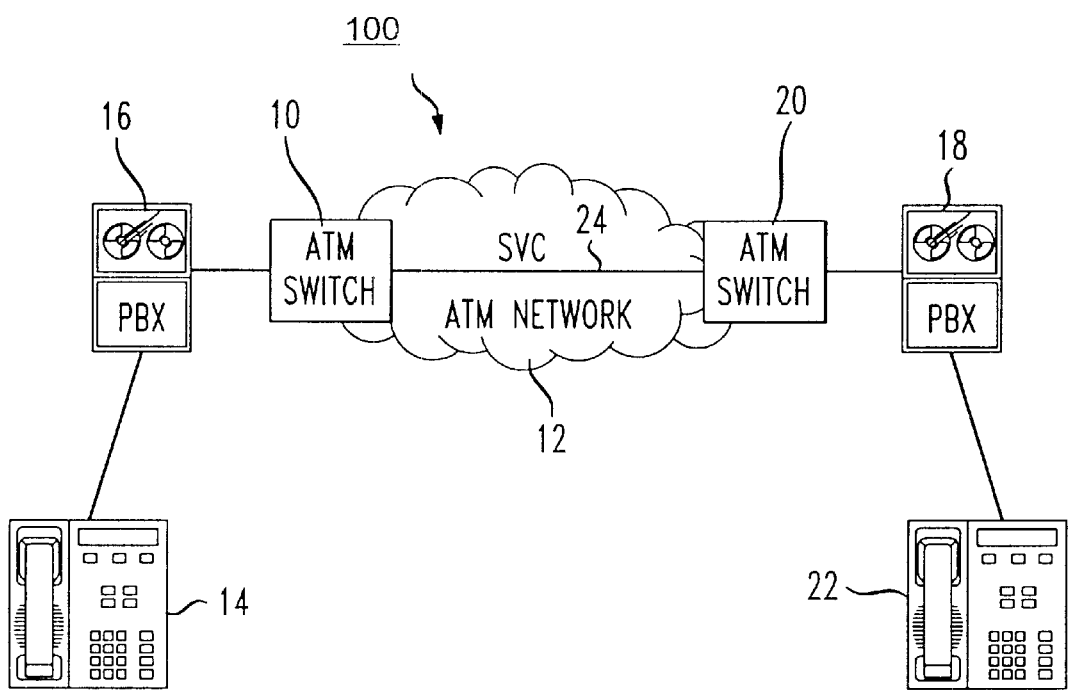
FIG. 1 is a block diagram of one embodiment of a telephony system that can implement the present invention.

FIG. 1 is a block diagram of a one embodiment of a telephony system that can implement the present invention. The telephony system 100 includes an ATM network 12. ATM network 12 includes a plurality of ATM switches communicating with each other via an SVC 24. Only the two endpoint ATM switches 10 and 20 are shown in FIG. 1, however, other ATM switches can be included between ATM switches 10 and 20. Both switch 10 and switch 20 can be considered gateway switches to ATM network 12, depending on whether the telephone call is originating from telephone 14 or telephone 22, respectively.

A calling party initiates a telephone call over ATM network 12 though a telephone 14 coupled to a private branch exchange ("PBX") 16. The called party of the telephone call receives the telephone call on a telephone 22 coupled to a PBX 18.

Instead of using PBXs 16 and 18, any other narrow band Integrated Services Digital Network ("N-ISDN") device may be used to couple telephones 14 and 22 to ATM network 12.

Switch 10, in response to an incoming voice telephone call, initiates an ATM switch virtual circuit (SVC) to switch 20. In setting up this connection, switch 10 passes to switch 20 information that tells switch 20 that this is an initial connection for the call together with an identifier for the connection. The identifier can be encoded in a standard ITU SET UP message in a variety of ways, using information elements ("IE") such as Broadband Lower Layer Information ("BLLI"), Generic Information Transport ("GIT") and User-to-User ("UU"). In setting up the call, switch 10 allocates 64 Kbps of bandwidth to the connection. For the purposes of this patent, the initial connection is referred to as "SVC 1".

In the middle of the call, after detecting that the call is a voice call and not a fax call, switch 10 may decide to change the traffic descriptor of the SVC, from, for example, 64 Kbps to 16 Kbps so that the voice call is compressed. In another embodiment, switch 20 instead of switch 10 may decide to change the traffic descriptor. In the present invention, switch 10 accomplishes this by placing another SVC (referred to for the purposes of this patent as "SVC 2") with the desired traffic descriptor to switch 20, and then switching the traffic over to SVC 2. After switching over the traffic, switch 10 will then tear down SVC 1. The present invention executes this switch-over quickly and harmoniously, without interrupting service.

In one embodiment, user traffic is sent in packets. Each packet has a header which contains a field that specifies the payload type. There can be many payload types for user traffic (e.g., 64 Kbps PCM, 16 Kbps G.728 LD-CELP, packet mode data, etc.). One payload type is control packets. All the messages described below between switch 10 and switch 20 are control packets. In general, control packets include the following information:

A Message ID which identifies the message and is desirable because multiple copies of the same message may be transmitted to ensure delivery;

A Message Type which identifies the type of control message being carried in the packet;

Message specific information which is information specifying a particular type of control information; and A Cyclic Redundancy Check which is used to protect against errors.

In one embodiment, to ensure the delivery of a message, each message is initially sent three times and then once every k msec (~200 msec to 1 sec), unless otherwise stated.

Figure 2:
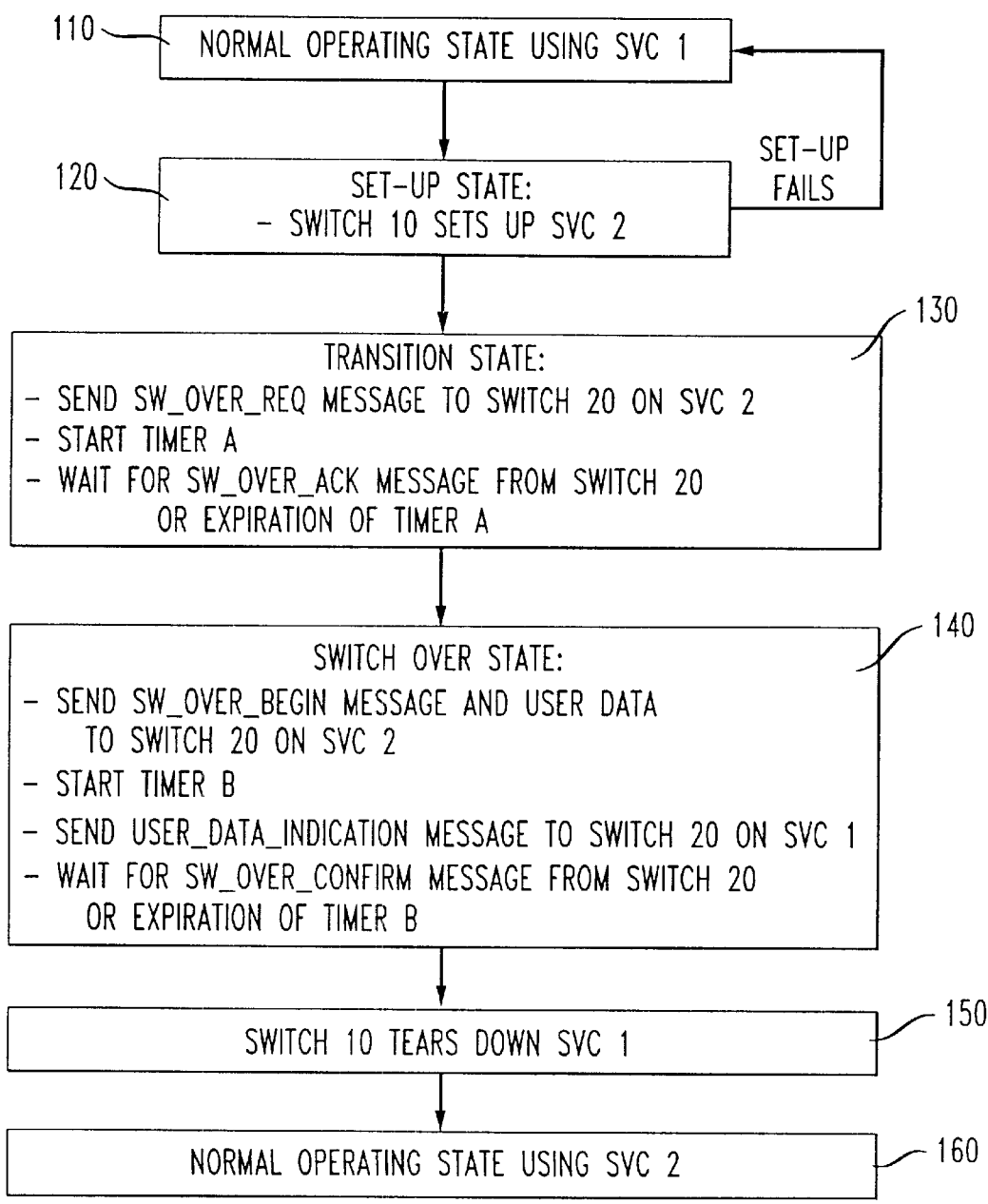
FIG. 2 is a flowchart illustrating the steps performed by a first switch in accordance with one embodiment of the present invention when the first switch switches-over from a first SVC to a second SVC.
Figure 3:
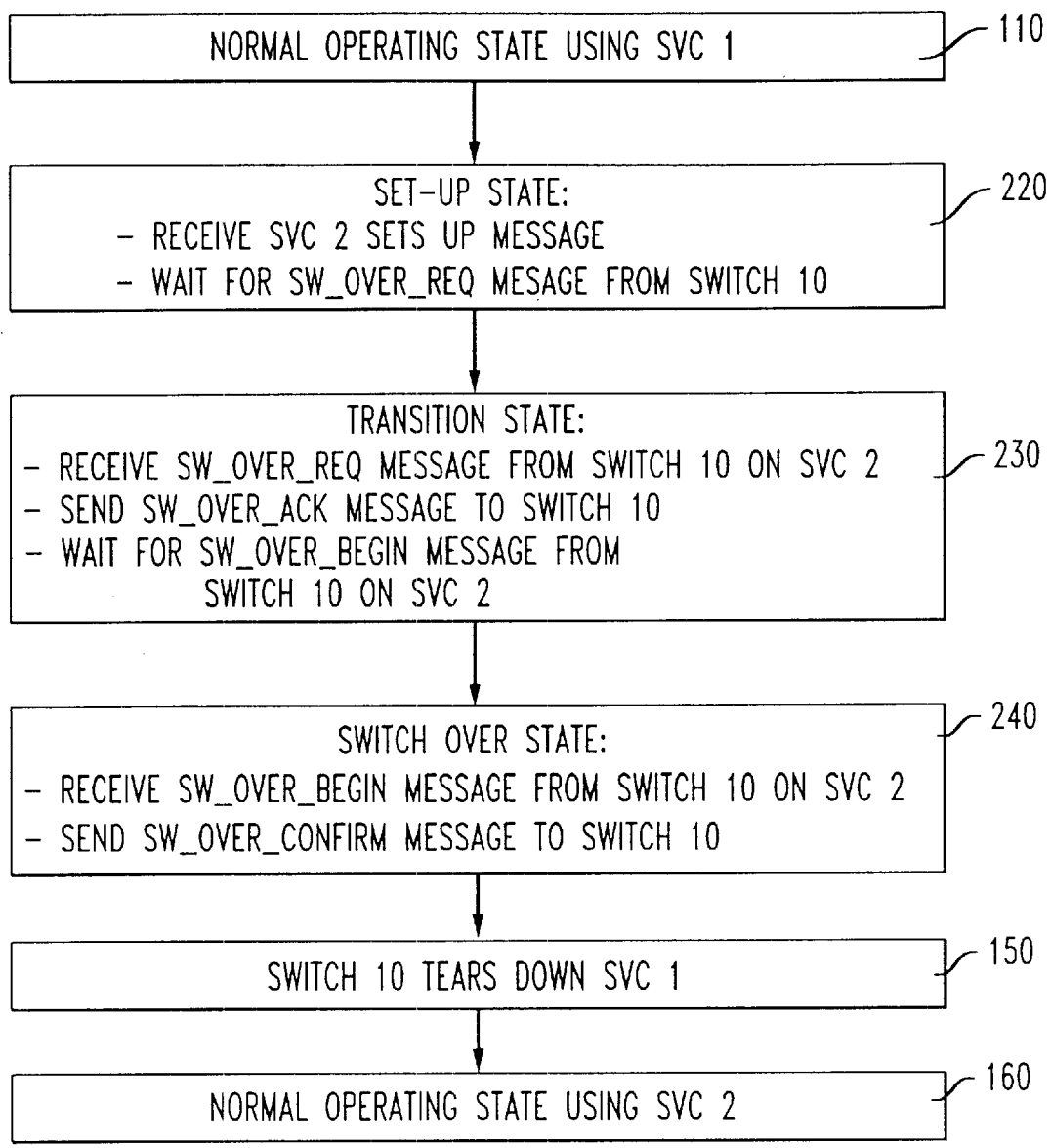
FIG. 3 is a flowchart illustrating the steps performed by a second switch in parallel with the steps of the first switch when the first switch switches-over from the first SVC to the second SVC in accordance with one embodiment of the present invention.

FIG. 2 is a flowchart illustrating the steps performed by gateway ATM switch 10 in accordance with one embodiment of the present invention when switch 10 switches over from SVC 1 to SVC 2. Similarly, FIG. 3 is a flowchart illustrating the steps performed by switch 20 in parallel with the steps of switch 10 in FIG. 2 when switch 10 switches over from SVC 1 to SVC 2 in accordance with one embodiment of the present invention. If switch 20 performs the switch-over, the steps performed by switch 10 in FIG. 2 are instead performed by switch 20, and the steps performed by switch 20 in FIG. 3 are instead performed by switch 10.

At step 110, switch 10 and switch 20 are initially in a normal operating state transmitting and receiving data from SVC 1. When switch 10 decides to switch-over to SVC 2 that has a different traffic description, switch 10 enters an SVC Set-up state 120.

In SVC Set-up state 120, switch 10 sends an ITU ATM SET UP message for SVC 2 to switch 20. The set-up message tells switch 20 that SVC 2 is a replacement SVC for SVC 1 and includes an identifier that identifies SVC 2. As with the identifier for SVC 1, the identifier for SVC 2 can be encoded using many possible different IEs.

In the SVC Set-up state 120, switch 10 wait for the completion of the set-up of SVC 2. Switch 10 will also not accept any replacement SVC call set-up request from switch 20 for SVC 1 until it reenters the normal operating state again.

If the SVC 2 connection set-up fails at SVC Set-up 120, switch 10 returns to the normal state 110 with SVC 1 continuing to carry the user data. If the connection set-up succeeds at SVC Set-up 120, switch 10 then enters the Transition state 130.

Further, if the connection set-up succeeds at SVC Set-up 120, switch 20 enters Set-up state 220. In this state, switch 20 has received the SVC 2 SET UP message from switch 10 and will not initiate a switch-over process.

In the Transition state 130, switch 10 sends a sw_over_req (switch-over request) message to switch 20 on SVC 2. Switch 10 also starts timer A. Timer A is used in case the sw_over_req message is lost. During Transition state 130, switch 10 sends and receives data on both SVC 1 and SVC 2. Since the propagation delay of SVC 1 and SVC 2 may be different, it is possible that switch 10 will have user data in the receive buffer of SVC 1 and SVC 2 at the same time. In this case, user packets in the SVC 1 receive buffer have precedence over those in the SVC 2 receive buffer. They will be read first before the ones for SVC 2 are read.

When switch 20 receives the sw_over_req message, switch 20 enters Transition state 230. In this state, switch 20 responds by sending to switch 10 a sw_over_ack (switch-over acknowledge) message on SVC 2. In state 230, switch 20 sends data over SVC 1 but is ready to receive over both SVC 1 and SVC 2

In one embodiment, while in Transition state 130, switch 10 waits for the receipt of the sw_over_ack message from switch 20 on SVC 2 or the expiration of timer A, whichever comes first. Switch 10 then enters a Switch-over state 140. In another embodiment, if timer A expires without receiving the sw_over_ack message, switch 10 terminates SVC 2 and returns to the normal operating state 110 with only SVC 1 operating.

In Switch-over state 140, switch 10 sends a sw_over_begin (switch-over begin) message over SVC 2 and begins to send user data over SVC 2 to switch 20. Switch 10 also starts a timer B. Timer B is used in case the sw_over_begin message is lost. Switch 10 also sends user_data_ind (user data indication) messages continuously over SVC 1. User_data_ind messages function as dummy messages and are used to hold onto SVC 1. They indicate that user packets are now on the other SVC (i.e., SVC 2) and are not passed to the users.

Meanwhile, switch 20 moves to Switch-over state 240 when the sw_over_begin message is received from switch 10. In Switch-over state 240, switch 20 responds by sending to switch 10 a sw_over_confirm (switch-over confirm) message on SVC 2. Switch 20 begins to send data over SVC 2.

After sending the sw_over_begin message in Switch-over state 140, switch 10 waits until either it receives the sw_over_confirm message from switch 20 or timer B expires. When one of these events takes place, switch 10 tears down SVC 1 at step 150.

After tearing down SVC 1, both switch 10 and switch 20 enters a normal operating state 160 with SVC 2 operating.

To summarize the steps shown in FIGS. 2 and 3, the following six steps are performed by switch 10 and switch 20:

(1) Initially, both ATM switches 10 and 20 are sending and receiving packets over SVC 1.
(2) ATM switch 10 starts the process by sending the switch_over_req message informing ATM switch 20 to get ready.
(3) Switch 20 responds with the switch_over_ack message. ATM switch 20 stills sends data over SVC 1 but is ready to receive over both SVC 1 and SVC 2. At this time, ATM switch 10 still sends and receives over SVC 1.
(4) Upon the receipt of the switch_over_ack message, ATM switch 10 will send over SVC 2 and is read to receive over both SVC 1 and 2. It also sends the switch_over_begin message. At this time, ATM switch 10 is sending over SVC 2 and receives over SVC 1 and SVC 2. ATM switch 20 is sending over SVC 1 and is ready to receive over both SVC 1 and SVC 2.
(5) Upon the receipt of the switch_over_begin message, ATM switch 20 sends data over SVC 2 and receives over SVC 2. It will also respond with switch_over_confirm message. At this time, ATM switch 20 is sending and receiving over SVC 2. ATM switch 10 is sending over SVC 1 and receives over both SVC 1 and SVC 2.
(6) Upon the receipt of the switch_over_confirm message, ATM switch 10 sends and receives over SVC 2. It also tears down SVC 1. At this time, both ATM switches 10 and 20 send and receive over SVC 2.

There are many minor variations to the steps shown in FIGS. 2 and 3. For example, switch 20 can switch-over user data to SVC 2 after the receipt of the sw_over_request message instead of the sw_over_begin message.

Further, it is possible that switch 10 and switch 20 can simultaneously initiate replacement SVCs. This is known as a collision. There are many contention resolution schemes for a collision. A simple one is to have the called party of SVC 1 (i.e., switch 20) win all contention (or conversely the calling party of SVC 1).

During the switch-over process, SVC 1 or 2 may be unexpectedly disconnected because of, for example, failures in the network. In this case, the device that initiated the switch-over (i.e., switch 10) should perform the following steps:

Before the transmission of the sw_over_begin message, disconnect the remaining SVC and abandon the call; and After the transmission of the sw_over_begin message, disconnect SVC 1 and abandon the call if SVC 2 is disconnected. Otherwise, enter the normal operating state 160 with SVC 2 operating.

Similarly, the peer device (i.e., switch 20) should perform the following steps:

Before the receipt of the sw_over_begin message, disconnect the other SVC and abandon the call; and After the receipt of the sw_over_begin message, disconnect SVC 1 and abandon the call if SVC 2 is disconnected. Otherwise, enter the normal state 160 with SVC 2 operating.

In most embodiments, the paths of the two SVCs, SVC 1 and SVC 2, are identical and so the delay difference between them is very small. However, in some embodiments the paths of the SVCs could be different and so their propagation and switching delay would be different. If the ATM network is geographically small, this difference is again small. However, if the ATM network is large, the difference could be considerable.

If the delay of the second SVC, SVC 2, is less than the first SVC, SVC 1, the difference can be accommodated by using a larger buffer. If the delay of the second SVC is larger, then:

1. Small differences can be taken care of by the build out delay at the receiver.
2. Slightly larger differences can be taken care of by schemes such as adaptive clocking where the receiving ATM switch can slow down or speed up the clock for a short time.
3. If the user data stream is speech, the differences in delay can be accommodated by inserting speech samples.
4. If the user data stream is not speech and the difference is large, a new SVC may need to be established.

A new special packet can be introduced to estimate the delay difference. The transmitter can send such a packet over both SVCs upon establishing the second SVC. The receiving ATM switch can then estimate the delay from the arrival time of the packet. To ensure that a good estimate is obtained, multiple packets can be sent. The receiving ATM switch can also echo these packets back to the transmitting ATM switch which can serve as an acknowledgment as well as means for the transmitting ATM switch to obtain the delay estimates.

Further, if a difference in delay between SVCs is a concern, multiple new SVCs can be established (instead of a single new one) and the best one could be selected.

As described, in the present invention one of the endpoint ATM switches will establish a second ATM SVC when the characteristics of the first ATM SVC needs to be changed. Once the second SVC is established, the two end ATM switches will switch user traffic from the original SVC to the new SVC. The present invention insures that the switch-over is accomplished without interrupting service.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of changing the bandwidth of telephone call data on an asynchronous transfer mode (ATM) network that is initially transmitted via a first switched virtual circuit (SVC) between a first ATM switch and a second ATM switch at a first bandwidth, said method comprising:

(a) sending a set-up message for a second SVC from the first ATM switch to the second ATM switch;

(b) sending a switch-over request message from the first ATM switch to the second ATM switch via the second SVC;

(c) sending a switch-over acknowledge message from the second ATM switch to the first ATM switch via the second SVC;

(d) sending a switch-over begin message from the first ATM switch to the second ATM switch via the second SVC;

(e) sending a switch-over confirm message from the second ATM switch to the first ATM switch via the second SVC; and (f) transmitting the telephone call data via the second SVC at a second bandwidth that differs from the first bandwidth.

2. The method of claim 1, wherein the telephone call data is transmitted un-compressed via the first SVC and compressed via the second SVC.

3. The method of claim 1, wherein the telephone call data is transmitted compressed via the first SVC and un-compressed via the second SVC.

4. The method of claim 1, further comprising:

starting a first timer at the first ATM switch when the switch-over request message is sent;

wherein step (d) is executed when either the switch-over acknowledge message is received by the first ATM switch from the second ATM switch or the first timer expires.

5. The method of claim 4, further comprising:

starting a second timer at the first ATM switch when the switch-over begin message is sent; and tearing down the first SVC when either the switch-over confirm message is received by the first ATM switch from the second ATM switch or the second timer expires.

6. The method of claim 1, wherein step (b) is executed only if the second SVC is successfully set-up.

7. The method of claim 1, further comprising:

sending user data indication messages via the first SVC.

8. The method of claim 1, further comprising:

determining whether the telephone call data comprises a voice telephone call or a fax telephone call.

9. A telephony system comprising:

an asynchronous transfer mode (ATM) network that comprises a first ATM switch coupled to a second ATM switch; and a first switched virtual circuit (SVC) coupled to said first and second ATM switches;

wherein said first ATM switch is programmed to:

initially transmit telephone call data between said first and second ATM switches at a first bandwidth;

send a set-up message for a second SVC to said second ATM switch;

send a switch-over request message to said second ATM switch via the second SVC;

send a switch-over begin message from the first ATM switch to the second ATM switch via the second SVC; and transmit the telephone call data via the second SVC at a second bandwidth that differs from the first bandwidth.

10. The telephony system of claim 9, wherein said second ATM switch is programmed to:

send a switch-over acknowledge message to the first ATM switch via the second SVC in response to the switch-over request message; and send a switch-over confirm message to the first ATM switch via the second SVC in response to the switch-over begin message.

11. The telephony system of claim 9, wherein the telephone call data is transmitted un-compressed via the first SVC and compressed via the second SVC.

12. The telephony system of claim 9, wherein the telephone call data is transmitted compressed via the first SVC and un-compressed via the second SVC.

13. The telephony system of claim 9, wherein the switch-over request message is sent only if the second SVC is successfully set-up.

14. The telephony system of claim 9, said first ATM switch further programmed to:

send user data indication messages via the first SVC.

15. The telephony system of claim 9, said first ATM switch further programmed to:

determine whether the telephone call data comprises a voice telephone call or a fax telephone call.

16. A method of operating a first asynchronous transfer mode (ATM) switch, wherein said first ATM switch is within an ATM network and initially transmits data via a first switched virtual circuit (SVC) to a second ATM switch at a first bandwidth, said method comprising:

(a) sending a set-up message for a second SVC to the second ATM switch;

(b) sending a switch-over request message to the second ATM switch via the second SVC;

(c) sending a switch-over begin message to the second ATM switch via the second SVC; and (d) transmitting the data via the second SVC at a second bandwidth that differs from the first bandwidth.

17. The method of claim 16, wherein the data is transmitted un-compressed via the first SVC and compressed via the second SVC.

18. The method of claim 16, further comprising:

starting a first timer when the switch-over request message is sent;

wherein step (c) is executed when either a switch-over acknowledge message is received from the second ATM switch or the first timer expires.

19. The method of claim 18, further comprising:

starting a second timer when the switch-over begin message is sent; and tearing down the first SVC when either a switch-over confirm message is received from the second ATM switch or the second timer expires.

20. The method of claim 16, wherein step (b) is executed only if the second SVC is successfully set-up.

21. The method of claim 16, further comprising:

sending user data indication messages via the first SVC.

22. The method of claim 16, wherein the data is telephone call data.

23. The method of claim 22, further comprising:

determining whether the telephone call data comprises a voice telephone call or a fax telephone call.

* * * * *